United States Patent
El-Shall et al.

[11] Patent Number: 6,136,156
[45] Date of Patent: Oct. 24, 2000

[54] NANOPARTICLES OF SILICON OXIDE ALLOYS

[75] Inventors: Mohamed Samy Sayed El-Shall, Richmond, Va.; Daniel Graiver; Udo C. Pernisz, both of Midland, Mich.

[73] Assignee: Virginia Commonwealth University, Richmond, Va.

[21] Appl. No.: 08/813,626

[22] Filed: Jul. 14, 1997

Related U.S. Application Data

[62] Division of application No. 08/606,456, Mar. 1, 1996.

[51] Int. Cl.⁷ .................................................. C01B 33/00
[52] U.S. Cl. .............................. 204/157.41; 204/157.45; 204/157.51
[58] Field of Search ......................... 204/157.41, 157.45, 204/157.5, 157.51; 423/326, 327.1; 427/596, 597

[56] References Cited

U.S. PATENT DOCUMENTS

| | | |
|---|---|---|
| 5,168,097 | 12/1992 | Araya et al. . |
| 5,254,832 | 10/1993 | Gartner et al. ...................... 219/121.66 |
| 5,580,655 | 12/1996 | El-Shall et al. .......................... 428/402 |
| 5,593,742 | 1/1997 | Lux et al. ................................ 427/586 |
| 5,660,746 | 8/1997 | Witanachchi et al. ............. 219/121.66 |
| 5,695,617 | 12/1997 | Graiver et al. ...................... 204/157.41 |
| 5,897,945 | 4/1999 | Lieber et al. ............................ 428/323 |

OTHER PUBLICATIONS

M. Samy El-Shall et al., "Synthesis of Nanoscale Metal Oxide Particles . . . ", *The Journal of Physical Chemistry*, vol. 98, No. 12, pp. 3067–3070, Mar. 24, 1994.

*Primary Examiner*—Marie Yamnitzky
*Attorney, Agent, or Firm*—McGuire Woods, LLP

[57] ABSTRACT

Nanoparticles of silicon oxide alloys (i.e., oxides of SiMo, SiPt, and SiAl) are produced by laser vaporization of a silicon target and a target of a metal (i.e., Mo, Pt, or Al), in an oxygen containing atmosphere in a diffusion cloud chamber, where the target metal vapors aggregate into novel three-dimensional porous web structures. The structures have a homogeneous composition with a uniform ratio of silicon to the metal.

10 Claims, 3 Drawing Sheets

FIG. 1

NANOPARTICLES OF SILICON OXIDE ALLOYS

CROSS-REFERENCE TO RELATED APPLICATIONS

This is a divisional of application(s) Ser. No. 08/606,456 filed on Mar. 1, 1996, pending.

We described "Silica Nanoparticles" in our first prior copending application U.S. Ser. No. 08/398,268, filed Mar. 3, 1995, now U.S. Pat. No. 5,580,655. We described "Silicon Nanoparticles" in our second prior copending application U.S. Ser. No. 08/561,771, filed Nov. 22, 1995, now U.S. Pat. No. 5,695,617. Our present application, however, concerns nanoparticles of silicon oxide alloys, and not nanoparticles of silica or silicon.

BACKGROUND OF THE INVENTION

This invention is directed to silicon oxide alloy nanoparticles. The silicon oxide alloys are obtained by laser ablation of a silicon target and a target of a metal in an oxygen containing atmosphere. The morphology of the obtained silicon oxide alloy consists of nanoparticles about 5–50 nanometers (nm) in diameter, preferably about 10–20 nanometers. The nanoparticles are fused together (i.e., agglomerated) into an open three-dimensional network which is porous and has a high surface area.

The synthesis and characterization of nanoparticles has received attention in recent years for their use as catalysts. A range of nanoparticles has been produced by chemical and physical methods. The most common physical methods involve gas condensation techniques, where oven sources are used to produce metal vapors. In spite of success with these methods, there are still problems and limitations, such as (i) reactions between metal vapors and oven materials, (ii) inhomogeneous heating of the source, which limits control of particle size and distribution, (iii) incomplete vaporization of refractory metals due to low vapor pressure, (iv) limited control of aggregation, and (v) range of control of composition of mixed metal particles due to differences in composition between the alloys and mixed vapors.

The advantages over other heating methods which laser vaporization techniques provide are (i.) the production of high density metal vapor within a short period of time, i.e. $10^{-8}$ s, (ii) the generation of directional high speed metal vapor from a solid target for directional deposition of the particles, (iii) control of evaporation from specific spots on a target, and (iv) simultaneous or sequential evaporation of several different targets. Some of these advantages have been demonstrated in the synthesis of ultra-fine metal particles, but control of the nucleation process, which strongly affects particle size, composition, and morphology of the deposited material, has not yet been achieved.

What we discovered, however, is a new form of certain silicon oxide alloys in which nanoparticles of a silicon oxide metal oxide alloy aggregate into unique web microstructures. One of the nanoparticle silicon oxide alloys, i.e. the oxide of SiAl, emits a medium to strong white photoluminescence with a bluish tint, upon irradiation with blue light (i.e., about 430 nm) or ultraviolet light (i.e., about 230–360 nm). These web structured nanoparticle silicon oxide alloys have a controllable size and composition, and are synthesized by a technique combining advantages of pulsed laser vaporization, and controlled condensation in a diffusion cloud chamber, under well defined conditions of temperature and pressure.

We found that the SiPt nanoparticle oxide alloy is useful in catalysis. Its advantages in catalysis are its high surface area and high temperature stability. The SiMo and the SiAl nanoparticle oxide alloys are useful in modifying the photoluminescent properties of silica nanoparticles, as we determined that alloying changes the intensity and the wavelength of the emitted light. The SiAl nanoparticle oxide alloy is also suitable for its luminescence in applications where silica is used in semiconductor manufacture.

BRIEF SUMMARY OF THE INVENTION

Thus, our invention relates to nanoparticles of silicon oxide alloys prepared by laser ablation of a silicon target, and a metal target of molybdenum (Mo), platinum (Pt), or aluminum (Al), with a YAG-Nd laser to form three-dimensional web structures. Surprisingly, we discovered that one of these silicon oxide alloy nanoparticles (SiAl) emits light in the visible spectrum when excited by ultraviolet (UV) or blue light. We also discovered that two of these silicon oxide alloy nanoparticles (SiMo and SiPt) do not emit light in the visible spectrum when excited by UV or blue light. We further discovered that one of these silicon oxide alloy nanoparticles (SiPt) is useful in catalysis.

We characterized these nanoparticles by Scanning Electron Micrograph (SEM), and Energy Dispersive Spectroscopy (EDS), and found their composition to be that of true alloys. They are also stable in air to about 600° C. (1100° F.).

These and other features of our invention will be apparent from consideration of the following description.

BRIEF DESCRIPTION OF THE DRAWINGS

FIG. 2, in particular, is a Scanning Electron Micrograph (SEM) obtained for silicon oxide alloy nanoparticles (SiAl) synthesized according to our invention. The synthesis employed helium at a total pressure of 600 torr, and oxygen at a total pressure of 200 torr. The temperatures of the upper cold plate and the lower plate were −100° C. and 20° C., respectively.

FIG. 2 (at a magnification of 10,000) shows a unique agglomerate pattern of particles which appears as a web matrix. The web structure in FIG. 2 has spacing between strands (branches) of less than about one micron. The porous arrangement of aggregates, and corresponding inter-chain spacing, reveals a superstructure pattern of alternating areas of particles and holes.

FIG. 3 is a high resolution SEM image of the silicon oxide alloy particles shown in FIG. 2 at a magnification of 30,000. The SEM, as well as Transmission electron microscopy (TEM), reveal a high degree of homogeneity of particle size and shape. Individual particle sizes are between 10–20 nm, suggesting a range of several hundred to a few thousand molecules per particle. This pattern is very different from other nanoparticles synthesized by oven or sputtering techniques. We believe that the appearance of a web morphology is due to the mode of formation and aggregation in the chamber.

Ion mapping of Si and Al (not shown) also indicated a homogeneous distribution of these elements, with no obvious aggregation or phase separation.

All of the above data suggest these nanoscale particles to be composed of true alloy. In particular, the EDS clearly indicates no phase separation, and a high degree of homogeneity, with a constant ratio of the elements over large range orders throughout a given sample.

DETAILED DESCRIPTION

Our invention is directed to nanoparticles composed of silicon oxide alloys manufactured by laser ablation. Aggregated (i.e., fused) nanoparticle alloys can be obtained either by (i) laser ablating a silicon alloy target (i.e., an alloy of SiAl, SiMo, or SiPt) in an oxygen-containing atmosphere, or by (ii) splitting the laser beam and simultaneously laser ablating a silicon target (i.e., a Si rod), and a target of the metal (i.e., a rod of Al, Mo, or Pt) in the oxygen-containing atmosphere.

The composition of these nanoparticles is homogeneous, and contains the silicon and metal elements as oxides, with no observable phase separation or desegregation. These primary nanoparticles are agglomerated or fused together into an open three-dimensional network with high surface area.

New web structured nanoparticle silicon oxide alloys are obtained and prepared by combining laser vaporization of silicon and metal(s), with a controlled condensation from the vapor phase, in a modified upward thermal diffusion cloud chamber. In a preferred procedure, vapor phase silicon and metal oxides are generated in the chamber by pulsed laser vaporization of two targets.

One target is silicon, and the second target is a metal. Preferred metals are Mo, Al, or Pt, although other metals can be employed. Other metals include, for example, iron, cobalt, nickel, copper, chromium, titanium, and the lanthanide series such as lanthanum, cerium, and praseodymium.

The chamber contains oxygen and an inert carrier gas. Silicon oxide alloy nanoparticles form on the cold plate of the vacuum chamber shown in FIG. 1.

The web structured nanoparticle silicon oxide alloys are made by placing the two targets in the lower portion of the vacuum chamber, and subjecting them to split beams of a pulsed laser. The inert carrier gas can contain varying amounts of oxygen. Silicon vapors and metal vapors are generated in the chamber as a result of the pulsed laser vaporization. The vaporized silicon and metal atoms react with the oxygen and form silicon oxide and metal oxide, which in turn form clusters in the vapor phase in the vacuum chamber. A good mixing takes place in the vapor phase in the vacuum chamber. The well mixed vapor phase silicon oxide and the vapor phase metal oxide molecules are cooled, and then form silicon oxide alloy nanoparticles, upon condensing on the cold plate in the upper portion of the vacuum chamber.

The following example illustrates this pulsed laser vaporization procedure and our invention in more detail.

EXAMPLE I

Figure 2:
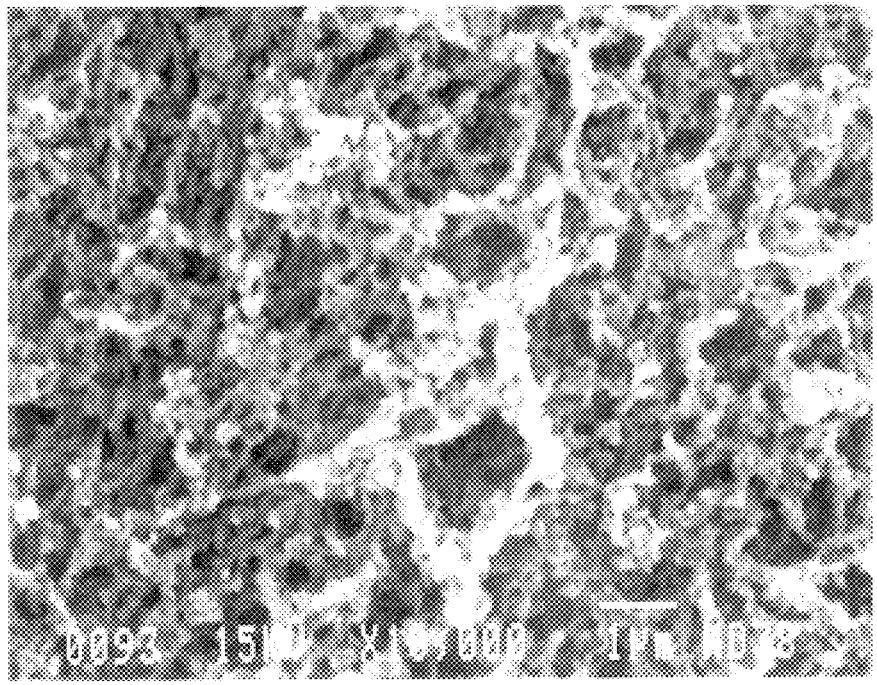
FIGS. 2 and 3 show the morphology of silicon oxide alloy nanoparticles prepared by laser ablation in helium at different magnifications. Oxygen was present in the chamber during preparation. For purpose of comparison, each figure shows a straight line in the lower right-hand corner labeled 1 μm (micron/micrometer).

An upward thermal diffusion cloud chamber was used for synthesis of our nanoscale silicon oxide alloy nanoparticles. The general principles of operation, design, and construction of such chambers, are described in detail in *THE JOURNAL OF CHEMICAL PHYSICS*, Volume 52, Number 9, May 1, 1970, Pages 4733–4748, which is incorporated herein by reference. In the *JOURNAL* on Page 4737, a cross-sectional view of a typical diffusion cloud chamber is shown in FIG. 2.

Figure 1:
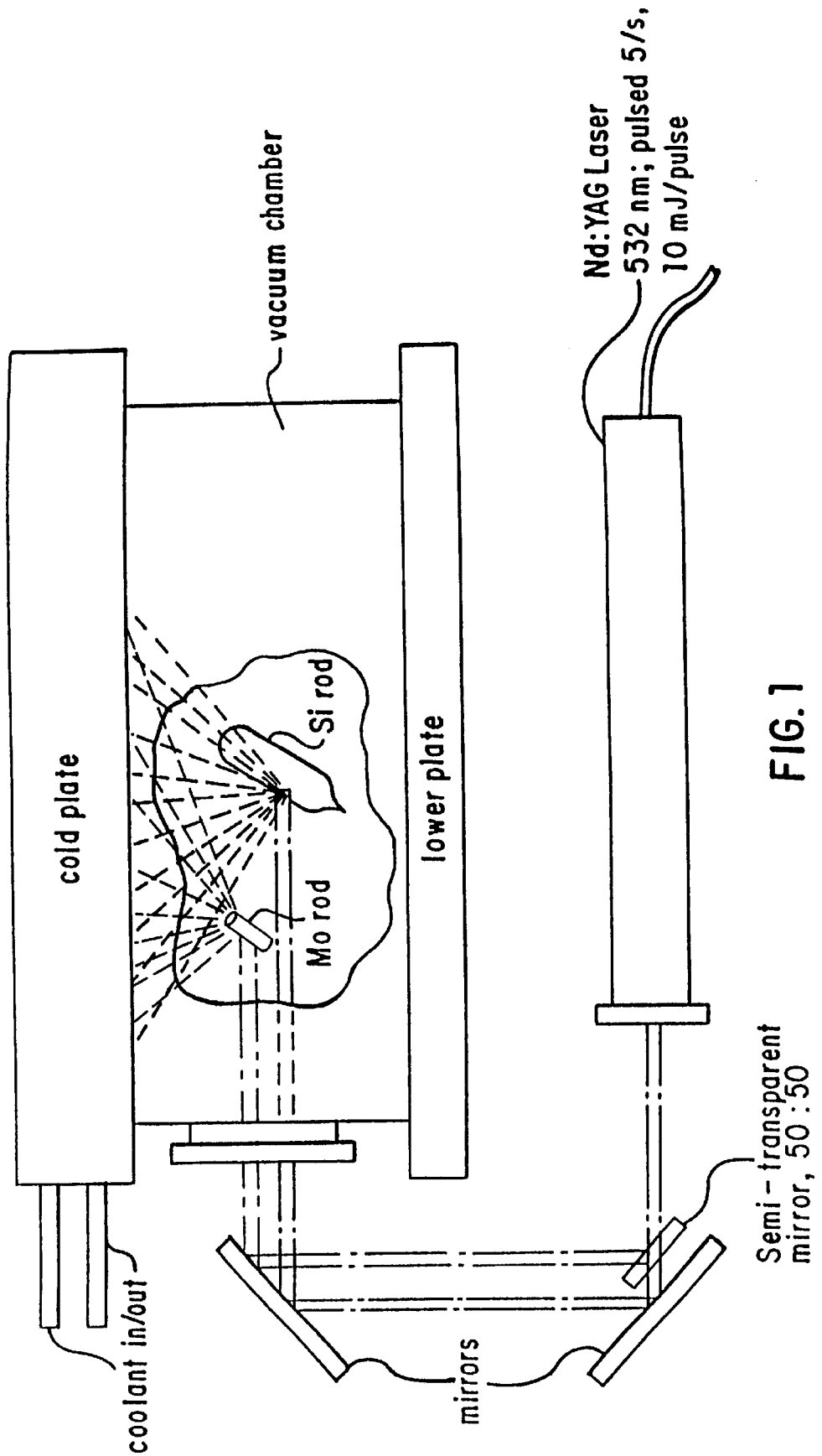
FIG. 1 is a simplified functional representation of an upward thermal diffusion cloud chamber used in the synthesis of silicon oxide alloy nanoparticles according to our invention.

However, we modified our particular chamber, to accommodate synthesis of the silicon oxide alloy nanoparticles. Our modified device is shown in FIG. 1. It can be seen to consist of two horizontal circular stainless steel plates separated by a circular glass ring forming a vacuum chamber. A cold plate is on top; and a lower, warmer plate is at the bottom. A silicon rod target (Si rod) and a molybdenum metal rod target (Mo rod) are mounted between the plates, preferably close to the lower plate. The vacuum chamber is filled to a total pressure of about 800 torr with a pure inert carrier gas such as helium or argon containing a known concentration of oxygen.

The silicon rod, the molybdenum metal rod, and the lower plate, are maintained at a temperature higher than the temperature of the cold plate. The cold plate is cooled to less than 120 K by circulating liquid nitrogen as coolant through a coolant inlet line and a coolant outlet line. These lines are in the interior of the cold plate, and are used to maintain a desired low temperature for the plate. A temperature gradient between the lower plate and the cold plate provides a steady convection current, which can be enhanced by adding helium, argon, krypton, or any other inert gas, under relatively high pressure, i.e. 1,000 torr. Silicon oxide vapor and vapor of the oxide of the metal are generated and mixed with a pulsed laser, using the second harmonic (532 nm) of a yttrium aluminum garnet-neodymium (YAG-Nd) laser (15–30 mJ/pulse, pulse duration $2 \times 10^{-8}$s).

Three mirrors are used to reflect and to split the beam from the laser to the targeted Si rod and the Mo rod. Beam splitting is accomplished with a semi-transparent mirror (50:50), which reflects one half of the beam to the Mo rod, while permitting the other half of the beam to pass through to the Si rod. The laser vaporization releases more than $10^{14}$ silicon and metal atoms per pulse. The silicon and metal atoms form clusters in the vapor phase of Si and Mo metal oxide molecules. The clusters collide with the inert carrier gas, and this results in cooling by means of collisional energy losses.

Under a total pressure of 600–800 torr for the inert carrier gas employed in our experiments, and 0–800 torr for oxygen, the Si and Mo metal oxides and clusters approach the thermal energy of the ambient gas within several hundred microns from the vaporization target. Clusters containing Si oxide and Mo metal oxide are carried by convection to the nucleation zone near the cold plate of the vacuum chamber, where silicon oxide alloy nanoparticles form. Significant coverage of the surface can be observed after about 1–2 hours.

Nichrome heater wires are wrapped around the glass ring of the vacuum chamber to provide sufficient heat to prevent condensation on the ring, and to maintain a constant temperature gradient between the lower plate and the cold plate. The particles form in the nucleation zone and condense on the cold plate during the laser vaporization (pulse rate 10 Hz) experiment. The vacuum chamber is then brought to room temperature (20–25° C./68–77° F.), and particles are collected under atmospheric conditions. No particles are found in the vacuum chamber except on the cold plate.

Glass slides and metal wafers are attached to the cold plate to collect material for examination and analysis of the morphology of the deposited silicon oxide alloy nanoparticles. Various analyses are carried out on the silicon nanoparticles including SEM, TEM, and EDS.

In a vacuum chamber of this type, temperature profile is a linear function of position between the two plates. Since equilibrium vapor pressure $P_e$ is approximately an exponential function of temperature, silicon oxide vapor and metal oxide vapor is supersaturated in the nucleation zone near the cold plate. Supersaturation can be varied and increased by increasing the temperature gradient between the two plates in the vacuum chamber. Thus, the higher the supersaturation, the smaller the size of the nucleus required for condensation. By controlling the temperature gradient, the total pressure, and the laser power, which determines the number and density of the Si and Mo metal atoms released in the vapor phase, the size of the condensing particles can be controlled.

The following table shows nanoscale particles prepared by the laser ablation method described in Example I. Separate targets were used, one being a silicon rod, and the other being either a Mo, Pt, or Al metal rod, mounted as shown in FIG. 1.

TABLE I

| Targets | Partial Pressure Oxygen torr | Partial Pressure Helium torr | Alloys of Silicon Oxides & Metal Oxides |
|---|---|---|---|
| Si/Mo | 0 | 800 | No photoluminescence; web structure. |
| Si/Mo | 2 | 800 | Same as above. |
| Si/Mo | 10 | 800 | Same as above. |
| Si/Mo | 100 | 800 | Same as above. |
| Si/Mo | 300 | 800 | Same as above. |
| Si/Mo | 800 | 800 | Same as above. |
| Si/Pt | 2 | 800 | Same as above. |
| Si/Pt | 100 | 800 | Same as above. |
| Si/Pt | 300 | 800 | Same as above. |
| Si/Pt | 800 | 800 | Same as above. |
| Si/Al | 200 | 600 | Medium to strong white photoluminescence with bluish tint; web structure. |

In Table I, varying the amount of oxygen in the chamber yields different oxides obtained from silicon, i.e., silicon monoxide (SiO) or silicon dioxide ($SiO_2$), and yields different oxides obtained from the metal, i.e., $MoO_2$, $MoO_3$, $Mo_2O_3$.

We determined that our nanoparticle silicon oxide alloys generally form a three-dimensional web structure in a porous arrangement of aggregates. The web structure has an inter-chain spacing and superstructure in the pattern of alternating areas of particles and holes.

Our process depicted in FIG. 1 yields a morphology that possesses several unique properties. Thus, our nanoparticle silicon oxide alloys have a large surface area, unusual adsorptive properties, and are capable of fast diffusivity. However, most surprising is our discovery that one of these agglomerated nanoparticles (i.e., the oxide of SiAl) emits a medium to strong white photoluminescence with a bluish tint in the blue region of the visible spectrum when excited by a UV source. The wavelength of the emitted light depends on the particular nanoparticle structure, which can be varied, depending on the experimental conditions in which the oxides of silicon and the oxides of aluminum condense, i.e. temperature gradient, laser power, laser wavelength, gas pressure, and gas type.

Samples of our silicon oxide alloy (SiAl) nanoparticles appear as a white powder. Their novel morphology can be seen by SEM in FIGS. 2 and 3. Thus, a web structure with strings of aggregated silicon oxide alloy nanoparticles is. apparent in FIG. 2. This web morphology is evident from the large number of small pores between silicon oxide alloy strands. The strands are less than one micrometer in size.

Figure 3:
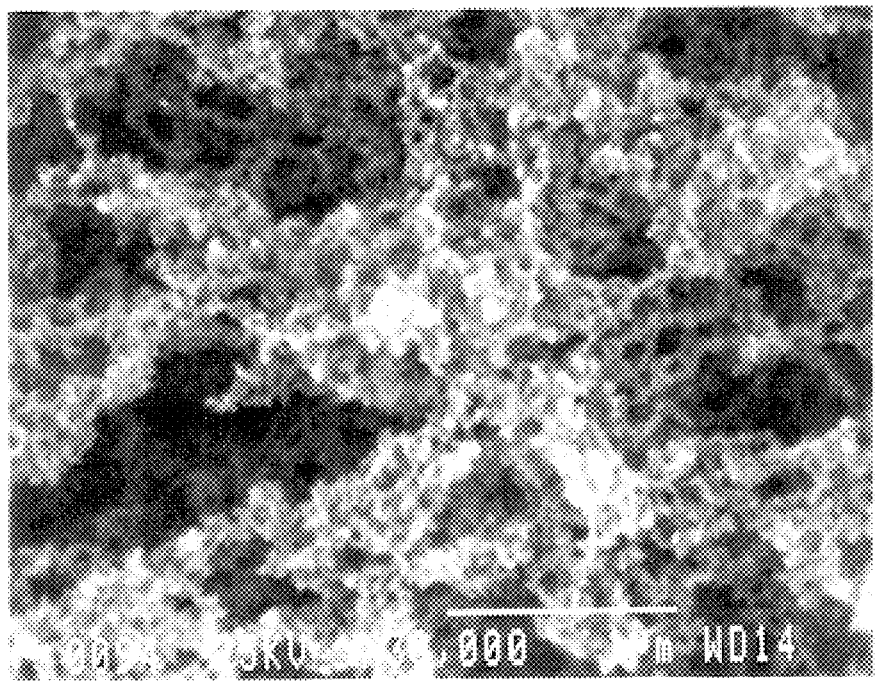
Figure 4:
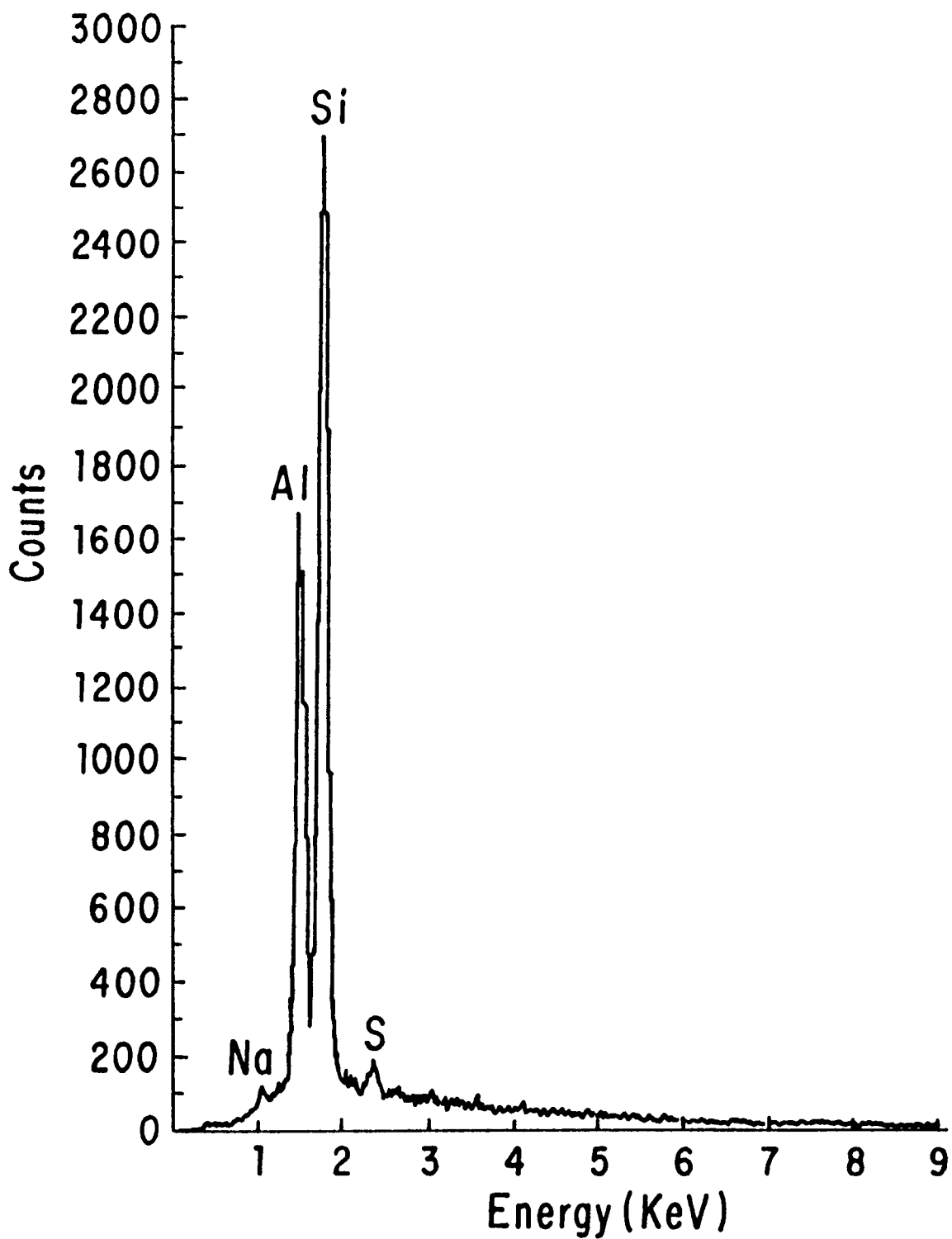
FIG. 4 is a typical graphical representation of Energy Dispersive Spectroscopy on nanoparticles of the oxide of SiAl. Identical spectrum was obtained from various locations throughout the examined sample. It clearly indicates a homogeneous composition with a constant ratio of silicon to aluminum. The ratio of Si:Al was about 2:1, and remained the same irrespective of the location throughout the sample, or the size and area of the sample examined. In particular, the weight percent of silicon to aluminum was 63 to 33 throughout the sample. The sodium (Na) and sulfur (S) peaks shown in FIG. 4 are present as contaminates. Since the approximate resolution of EDS is about one nanometer, it is apparent that an intimate mixing of the silicon and aluminum were obtained within this scale, yielding a uniform alloy of these two elemental oxides.

Aggregated silicon oxide alloy particles and their porous structure are visible at higher magnification in FIG. 3. The individual aggregated silicon oxide alloy particles in a strand are shown in FIG. 3. The particle size is uniform and about 10–20 nm.

The following examples illustrate the use of the oxide of SiPt in catalysis. In particular, hydrosilylation is the reaction of a silicon hydride containing compound with an unsaturated compound in the presence of a catalyst. Typically, the catalyst is platinum metal on a support, a platinum compound in an inert solvent, or a platinum complex. In the reaction, silicon compounds containing a silicon bonded H atom are reacted with certain compounds containing ethylenic or acetylenic linkages. The reaction proceeds by the addition of the silicon-hydrogen bond across a pair of aliphatic or alicyclic carbon atoms linked by multiple bond, i.e., $=C=C=$ or $—C\equiv C—$. An illustration of the hydrosilylation reaction is $\equiv SiH+CH_2=CHR \rightarrow \equiv SiCH_2CH_2R$.

EXAMPLE II 10 mmol of vinyltriethoxysilane $H_2C=CHSi(OC_2H_5)_3$ and 10 mmol of triethoxysilane $HSi(OC_2H_5)_3$ were reacted in the presence of 0.001 g of the oxide of SiPt as the hydrosilylation catalyst. The oxide of SiPt used was the species shown in Table I prepared at 300 torr oxygen. There was no reaction at ambient temperature (20–25° C./68–77° F.) after an hour, but a complete reaction occurred on heating at 50° C. for three hours. The product was a disilyethylene of the formula $(C_2H_5O)_3SiCH_2CH_2Si(OC_2H_5)_3$. The product distribution of this disilylethylene was similar to that obtained with a homogeneous platinum catalyst.

EXAMPLE III

Example II was repeated except that 10 mmol of 1-hexene $CH_3(CH_2)_3CH=CH_2$ and 10 mmol of pentamethyldisiloxane $H(CH_3)_2SiOSi(CH_3)_3$ were used as monomers in the reaction. The reaction was complete in 40 minutes at ambient temperature, and no side reactions were observed. The product formed was the disiloxane $[CH_3(CH_2)_3CH_2CH_2](CH_3)_2SiOSi(CH_3)_3$.

Equivalent amounts of $\equiv Si—H$ containing reactants and unsaturated alpha-olefin reactants should be employed in the process, and one ethylenic linkage is the theoretical equivalent of one silicon bonded hydrogen atom. It may be necessary however to use an excess of alpha-olefin to totally consume $\equiv SiH$ in the siloxane product.

The maximum amount of catalyst employed is determined by economical considerations, and the minimum amount by the type and purity of reactants employed. Very low concentrations of catalyst such as $1\times 10^{-10}$ mol catalyst per equivalent of the alpha-olefin compound, may be used when the reactants are extremely pure. However, it is possible to use about $1 \times 10^{-8}$ mol catalyst per equivalent weight of alpha-olefin compound, and even $1 \times 10^{-7}$ to $1 \times 10^{-3}$ mol catalyst, per equivalent weight of alpha-olefin.

Moles of catalyst are measured in terms of one mole providing one unit atom (e.g. one gram atom) of platinum. An equivalent weight of alpha-olefin is the amount of reactant furnishing one unit weight of ethylenic unsaturation (i.e. equivalent to one unit weight of ≡Si—H), regardless of what other reactive or potentially reactive substituents may be present. Thus, an equivalent weight of ethylene is its molecular weight.

The reaction temperature can vary, and optimum temperatures depend upon the concentration of catalyst, and the nature of the reactants. The reaction can be initiated at a temperature below room temperature (0° C. to −10° C.), and is exothermic once begun. The temperature should be one at which both reactants are in a liquid or gaseous state. The maximum temperature is determined by the stability of the reactants. Ordinarily, it is best to keep the reaction temperature below about 300° C. Best results with most reactants are obtained by initiating the reaction at about 80–180° C., and maintaining the reaction within reasonable limits of this range. The exothermic nature of the reaction may push the temperature up to 200–250° C. for a short time, however.

The optimum reaction time is a variable depending upon the reactants, reaction temperature, and catalyst concentration. Ordinarily, there is no benefit in extending the contact time of the reactants beyond 16 or 17 hours, but likewise there is usually no harm, unless an extremely elevated temperature is employed. With many reactants, a practical quantitative yield of product can be obtained in 30 minutes or less.

The reaction can be carried out at atmospheric, sub-atmospheric, or super-atmospheric pressure. Here again, the choice of conditions is largely a matter of logic, based upon the nature of the reactants, and the equipment available. Non-volatile reactants are especially adaptable to being heated at atmospheric pressure, with or without a reflux arrangement. Reactants which are gaseous at ordinary temperatures, are preferably reacted at substantially constant volume under autogenous or induced pressure.

Reference may be made to U.S. Pat. No. 5,359,113 (Oct. 25, 1994), incorporated herein by reference, for examples of other silicon hydride, unsaturated organic compounds, and unsaturated silicon compounds, which may be used in hydrosilylation reactions.

Some representative silicon hydrides are trimethylsilane, dimethylphenylsilane, dimethylsilane, dichlorosilane, dimethoxysilane, methyldimethoxysilane, triethylsilane, trichlorosilane, methyldichlorosilane, dimethylchlorosilane, trimethoxysilane, heptamethyltrisiloxane, dimethylsiloxanemethylhydrogen siloxane copolymers, and methylhydrogen cyclic siloxane polymers and copolymers.

Some representative unsaturated organic compounds are alpha-olefins $CH_2$=CHR including the alkenes with 2–30+ carbon atoms, preferably 6–30 carbon atoms, and most preferably 6–18 carbon atoms. Suitable alpha-olefins are ethene, propene, 1-butene, isobutylene (2-methylpropene), 1-pentene (C5), 2-methyl-1-butene, 3-methyl-1-butene, 1-hexene, 2-methyl-1-pentene, 3-methyl-1-pentene, 4-methyl-1-pentene, 1-heptene, 2-methyl-1-hexene, 1-octene, 2-methyl-1-heptene, 1-nonene, 1-decene (C10), 1-undecene, 1-dodecene, 1-tridecene, 1-tetradecene, 1-pentadecene (C15), 1-hexadecene, 1-octadecene, 1-nonadecene, 1-eicosene (C20), and those alpha-olefin fractions containing varying percentages of C22–C30+ alpha-olefins sold under the trademarks GULFTENE® 24–28 and GULFTENE® 30+, by Chevron Chemical Company, Houston, Tex.

Other representative unsaturated organic compounds are unsubstituted cycloalkenyl compounds such as cyclobutene, cyclopentene, cyclohexene, and cyclopentadiene; substituted cycloalkenyl compounds such as 3-methylcyclopentene, 3-chlorocyclobutene, and 4-phenylcyclohexene; halogenated unsaturated compounds such as vinyl chloride, allyl chloride, tetrafluoroethylene, vinylidene chloride, and dichlorostyrene; ethers such as vinyl ether and allyl ether; alcohols such as allyl alcohol and methylvinylcarbinol; acids such as acrylic acid, methacrylic acid, vinylacetic acid, and oleic acid; esters such as vinyl acetate, allyl acetate, butenyl acetate, allyl stearate, and diallyl phthalate; and nitrogen containing unsaturated compounds such as indigo, indole, acrylonitrile, and allyl cyanide.

Some representative unsaturated silicon compounds are compounds having the formula $(CH_2=CH)_a Si(OR')_{4-a}$; $CH_2=CHCH_2Si(OR')_3$; or $CH_2=CHCH_2Si(CH_3)(OR')_2$; where a is 1 or 2, and R' is an alkyl radical containing 1–6 carbon atoms. Other representative unsaturated silicon compounds are $ViMeSiCl_2$, $Vi_4Si$, $ViHSiPh_2$, cyclohexenyl triethylsilane, and octadecenyl methyldichlorosilane, where Vi, Me, and Ph represent vinyl, methyl, and phenyl, respectively.

In the embodiment of our invention illustrated in Examples II and III, alloys of silicon and other metals can also be used, in addition to the oxide of SiPt, for providing catalytic activity. For example, non-oxidizing metals such as osmium, iridium, ruthenium, rhodium, and palladium, can be alloyed with silicon, and used to form materials with catalytic activity.

Other variations may be made in compositions and methods described above without departing from the essential features of our invention. The forms of our invention are only exemplary and not limitations on its scope defined in the claims.

What is claimed is:

1. A method of making a porous material in a three-dimensional web structure of fused silicon oxide alloy nanoparticles comprising simultaneously subjecting silicon and a metal in a chamber containing an oxygen-containing inert carrier gas to a pulsed laser, generating mixed vapors of silicon oxide and oxide of the metal in the chamber as a result of the pulsed laser, cooling the mixture of vapor phase silicon oxide and vapor phase oxide of the metal with the carrier gas, and condensing the cooled mixture of vapor phase oxides to form silicon oxide alloy nanoparticles.

2. The method according to claim 1 in which the oxygen containing inert carrier gas is helium, argon, or krypton.

3. The method according to claim 2 including the additional step of establishing and maintaining a temperature gradient in the chamber between upper and lower portions thereof.

4. The method according to claim 3 in which the temperature in the lower portion of the chamber is higher than the temperature in the upper portion of the chamber.

5. The method according to claim 4 in which vaporization by the pulsed laser is provided by using the second harmonic of a yttrium aluminum garnet-neodymium laser at 532 nm with 15–30 mJ/pulse.

6. The method according to claim 1 in which the metal is molybdenum, platinum, or aluminum.

7. The method according to claim 6 in which the silicon and the metal are present in the chamber as one target comprising a silicon alloy of the metal.

8. The method according to claim 6 in which the silicon and the metal are present in the chamber as one target comprising silicon and a second target comprising the metal.

9. The method according to claim 6 in which the amount of oxygen in the chamber can be varied to yield nanoparticle oxides with a ratio of silicon to oxygen between 1:1 and 1:2.

10. The method according to claim 6 in which the amount of oxygen in the chamber can be varied to yield nanoparticle oxides with a ratio of molybdenum to oxygen between 1:1.5 and 1:3.

* * * * *